United States Patent
Liao et al.

(10) Patent No.: US 10,348,357 B2
(45) Date of Patent: Jul. 9, 2019

(54) SINGLE FEED-IN DUAL-BRAND ANTENNA STRUCTURE

(71) Applicant: Power Wave Electronic Co., Ltd., Taipei (TW)

(72) Inventors: Wen-Jiao Liao, Taipei (TW); Wei-Hong Tsai, Taipei (TW); Yun-Chan Tsai, Taipei (TW)

(73) Assignee: POWER WAVE ELECTRONIC CO., LTD., Taipei (TW)

( * ) Notice: Subject to any disclaimer, the term of this patent is extended or adjusted under 35 U.S.C. 154(b) by 289 days.

(21) Appl. No.: 15/614,610

(22) Filed: Jun. 6, 2017

(65) Prior Publication Data
US 2018/0351252 A1 Dec. 6, 2018

(51) Int. Cl.
*H01Q 1/22* (2006.01)
*H04B 1/52* (2015.01)
*H01Q 1/36* (2006.01)
*H01Q 9/42* (2006.01)
*H01Q 5/335* (2015.01)
*H01Q 5/371* (2015.01)

(52) U.S. Cl.
CPC ............. *H04B 1/52* (2013.01); *H01Q 1/2291* (2013.01); *H01Q 1/36* (2013.01); *H01Q 5/335* (2015.01); *H01Q 5/371* (2015.01); *H01Q 9/42* (2013.01)

(58) Field of Classification Search
CPC ........ H01Q 1/2291; H01Q 1/243; H01Q 1/38; H01Q 5/335–371; H01Q 9/42; H01Q 9/0407
See application file for complete search history.

(56) References Cited

U.S. PATENT DOCUMENTS

| | | | |
|---|---|---|---|
| 7,274,340 B2 * | 9/2007 | Ozden | H01Q 1/243 343/700 MS |
| 9,391,371 B2 * | 7/2016 | Goto | H01Q 25/50 |
| 2007/0236394 A1 * | 10/2007 | Aoyama | H01Q 1/243 343/700 MS |

* cited by examiner

*Primary Examiner* — Dameon E Levi
*Assistant Examiner* — Hasan Z Islam
(74) *Attorney, Agent, or Firm* — Chun-Ming Shih; HDLS IPR Services

(57) ABSTRACT

A single feed-in dual-band antenna structure includes a first radiation unit, a basal plate and a plurality of matching components. The basal plate includes a front side, a back side and an edge side. A first ground unit, a signal feed-in unit, a second radiation unit and an electrode part are arranged on the front side. A third radiation unit is arranged on the edge side. A second ground unit is arranged on the back side of the basal plate. The first radiation unit is electrically connected to the electrode part. The first radiation unit is adjusted to control the 2.45 GHZ frequency range impedance, resonant frequency, bandwidth and radiation effect. The third radiation unit frequency wave length controls the 5 GHZ frequency range to achieve the predetermined target impedance, resonant frequency, bandwidth and radiation efficiency. The antenna size can be reduced effectively.

15 Claims, 5 Drawing Sheets

SINGLE FEED-IN DUAL-BRAND ANTENNA STRUCTURE

BACKGROUND OF THE INVENTION

Field of the Invention

The present invention relates to an antenna, and especially relates to a single feed-in dual-band antenna structure applying to the global positioning system (GPS) and WiFi.

Description of the Related Art

It is well known that at least a communication system is arranged in the existing action-style electronic apparatus, so that the action-style electronic apparatus can perform the short distance or long distance communication or data transmission with an electronic apparatus or another action-style electronic apparatus.

With the continuous progress of the modern science and technology, a lot of action-style electronic apparatuses are slim and compact. In that case, when the action-style electronic apparatus communicates with the devices or systems of navigation or communicates with the devices or systems in the short or long distance, various antennas have to be arranged in the action-style electronic apparatus, and if the inner space of the action-style electronic apparatus is limited, the volumes of the circuit board or other components inside the action-style electronic apparatus have to be reduced. If the volumes of the circuit board or other components inside the action-style electronic apparatus cannot be reduced anyway, the volume of the antenna has to be reduced.

After the volume of the antenna is reduced, the antenna can be integrated with the circuit board or other components of the action-style electronic apparatus. But if the volume of the antenna is reduced, the receiving and transmitting performance of the antenna may be decreased, so that the action-style electronic apparatus cannot or cannot efficiently communicate with or transmit data to the electronic apparatuses or action-style electronic apparatuses in the short or long distance.

SUMMARY OF THE INVENTION

Therefore, the main object of the present invention is to solve the above-mentioned problems. The present invention re-designs the antenna. The present invention adjusts the first radiation unit to control the 2.45 GHZ frequency range impedance, resonant frequency, bandwidth and radiation effect. According to the third radiation unit frequency wave length ($\frac{1}{2}\lambda$, $\frac{1}{4}\lambda$, $\frac{1}{8}\lambda$ or $\frac{1}{16}\lambda$), the present invention controls 5 GHZ (4.9 GHZ-6 GHZ) frequency range to achieve the predetermined target impedance, resonant frequency, bandwidth and radiation efficiency. The antenna efficiency can be increased effectively and the antenna size can be reduced effectively.

In order to achieve the above-mentioned object, the present invention provides a single feed-in dual-band antenna structure comprising a first radiation unit, a basal plate and a plurality of matching components. The basal plate comprises a front side, a back side and an edge side. A first ground unit, a signal feed-in unit, a second radiation unit and an electrode part are arranged on the front side. A third radiation unit is arranged on the edge side. Moreover, a second ground unit corresponding to the first ground unit is arranged on the back side of the basal plate. The first radiation unit is electrically connected to the electrode part. The matching components are electrically connected between the first ground unit, the signal feed-in unit and the electrode part.

In an embodiment of the present invention, a spacing is between the signal feed-in unit and the first ground unit. The signal feed-in unit comprises a first signal feed-in line and a second signal feed-in line. The first signal feed-in line comprises a first endpoint and a second endpoint. The second signal feed-in line comprises a third endpoint and a fourth endpoint. A gap is between the second endpoint and the third endpoint.

In an embodiment of the present invention, the second endpoint and the third endpoint are electrically connected to the matching components across the gap.

In an embodiment of the present invention, the second radiation unit comprises a first radiation line segment and a second radiation line segment. One side of the first radiation line segment is electrically connected to the first signal feed-in line. The other side of the first radiation line segment is extended to the edge side and is corresponding to the second radiation line segment.

In an embodiment of the present invention, the matching components are electrically connected between the first radiation line segment and the second radiation line segment.

In an embodiment of the present invention, the third radiation unit is arranged on the edge side and is electrically connected to the second radiation line segment of the second radiation unit.

In an embodiment of the present invention, the first radiation unit comprises a base and a metal layer which is arranged on a surface of the base. The metal layer comprises a plurality of straight lines, a plurality of wires and an electrode tip. The straight lines are arranged on a top face and a bottom face of the base. The wires penetrate the base and are electrically connected to two sides of the straight lines and the electrode tip, so that the metal layer twines and is arranged at the base. The base is a ceramic material or fiberglass.

In an embodiment of the present invention, the electrode part comprises a first electrode part and a second electrode part. The first electrode part is corresponding to the first signal feed-in line of the signal feed-in unit. The first electrode part and the second electrode part are electrically connected to the electrode tip of the first radiation unit.

In an embodiment of the present invention, the matching components are electrically connected between the first electrode part and the first endpoint of the first signal feed-in line.

In an embodiment of the present invention, the matching components are electrically connected to the first ground unit and between the first signal feed-in line and the second signal feed-in line respectively.

In an embodiment of the present invention, the matching component is an inductance element.

In an embodiment of the present invention, a length of the third radiation unit is between 2 mm and 20 mm.

In an embodiment of the present invention, one side of the second radiation unit is electrically connected to the first signal feed-in line of the signal feed-in unit. The other side of the second radiation unit is extended to the edge side and is electrically connected to the third radiation unit.

In an embodiment of the present invention, a clearance area corresponding to the first radiation unit is arranged on the back side of the basal plate.

DETAILED DESCRIPTION OF THE INVENTION

Now please refer to following detailed description and figures for the technical content of the present invention.

Figure 1:
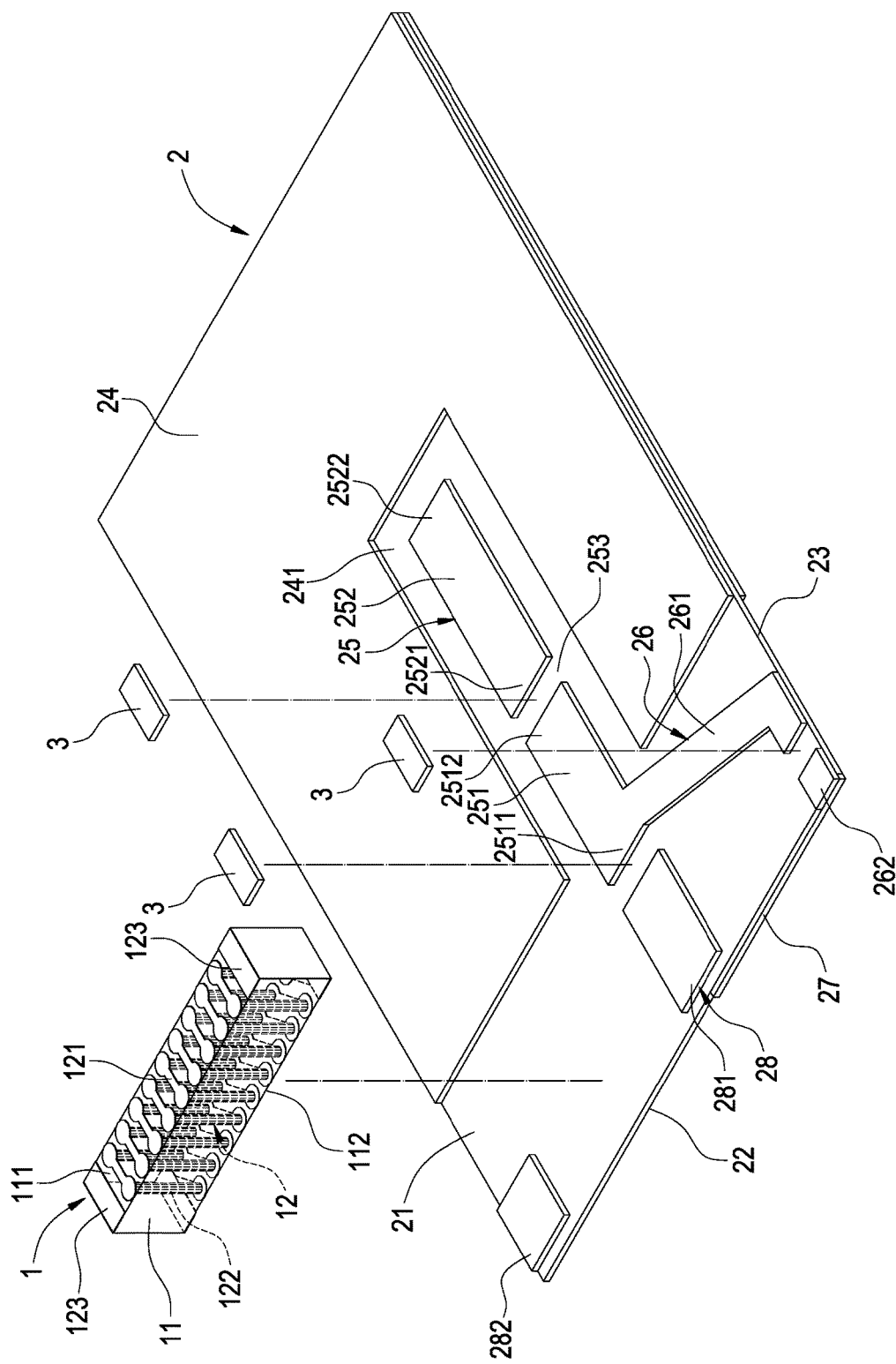
FIG. 1 shows an exploded view of the single feed-in dual-band antenna structure of the first embodiment of the present invention.
Figure 2:
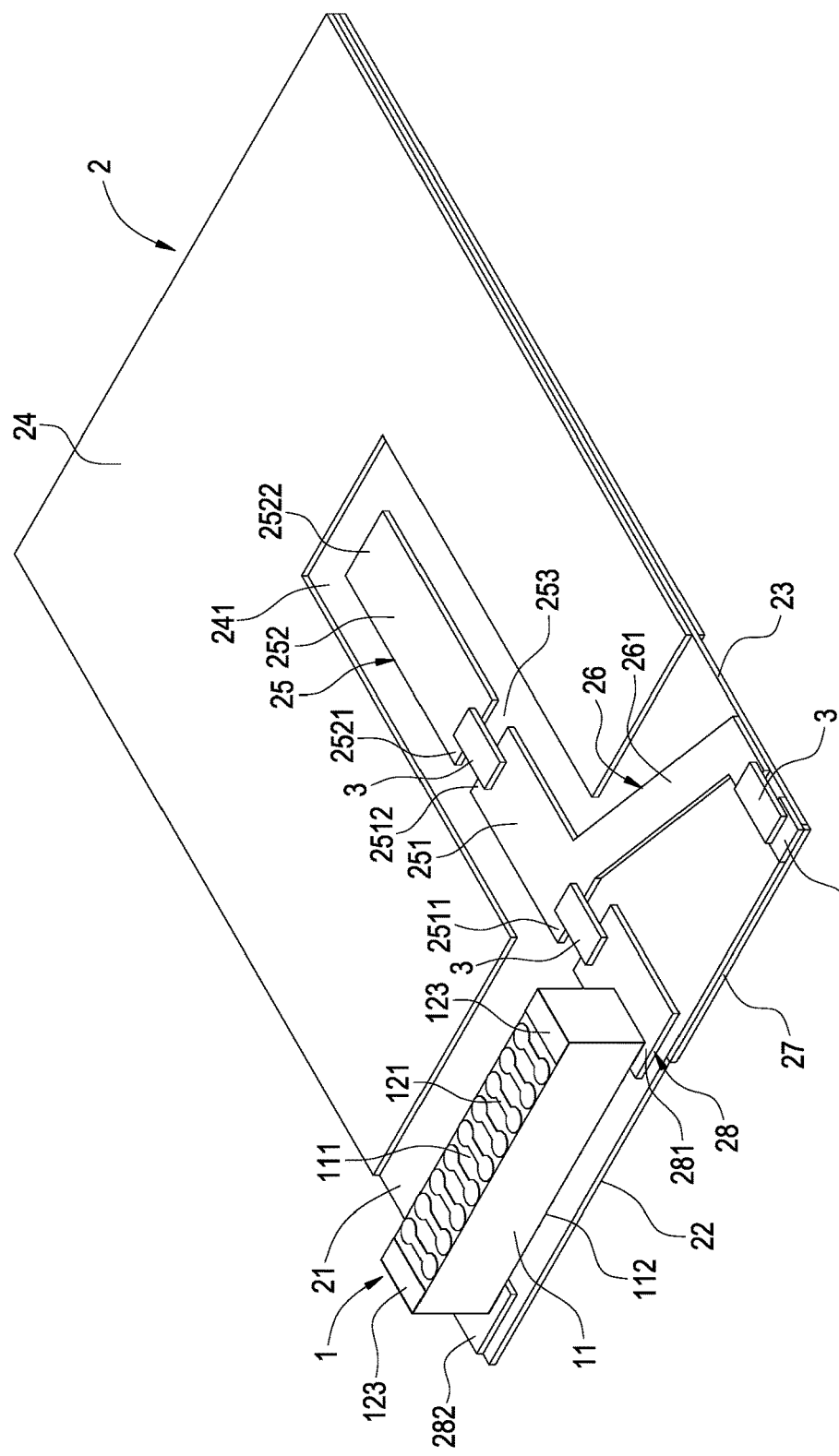
FIG. 2 shows an assembly drawing of the single feed-in dual-band antenna structure of the first embodiment of the present invention.
Figure 3:
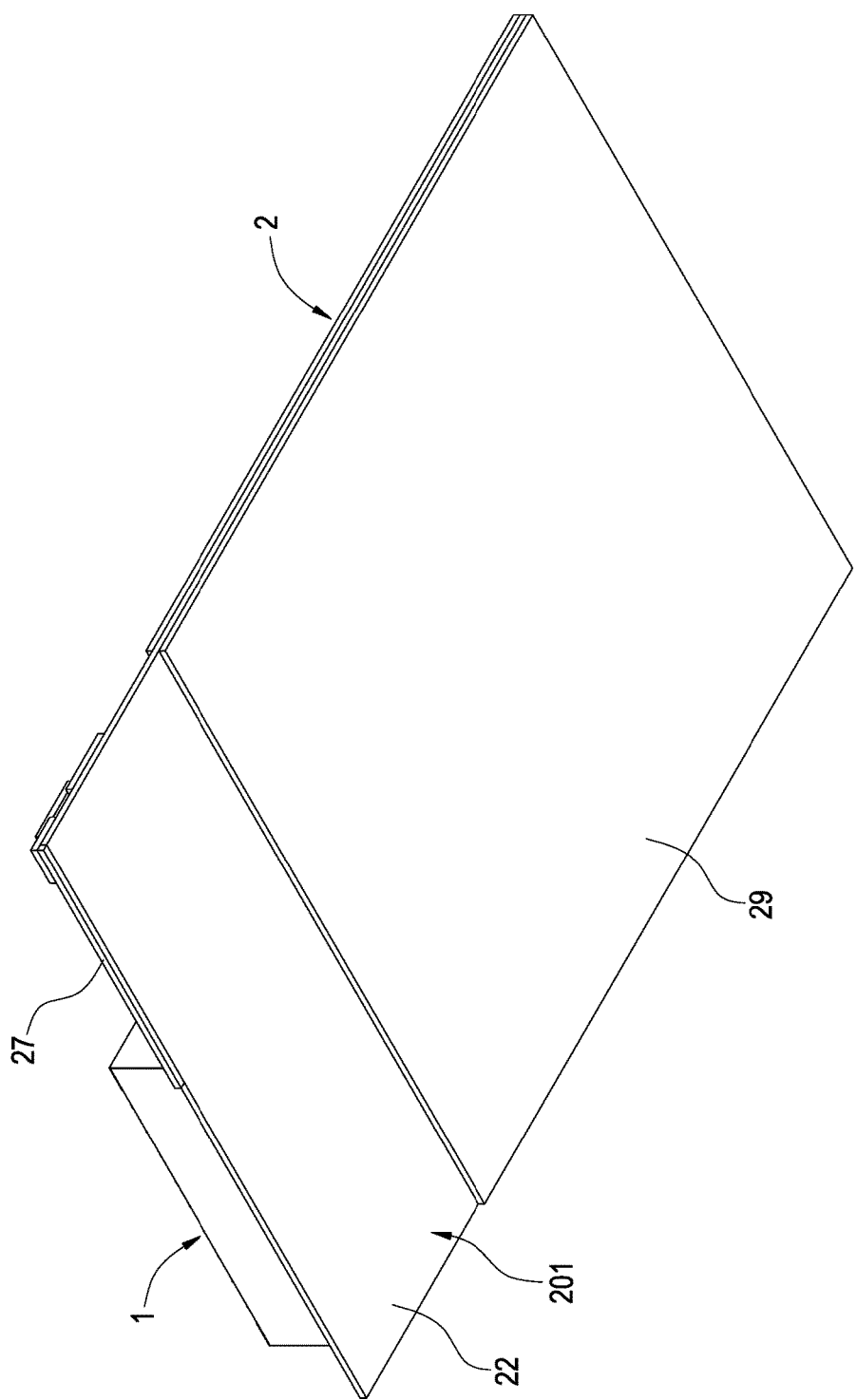
FIG. 3 shows another side of the basal plate of FIG. 2.

FIG. 1 shows an exploded view of the single feed-in dual-band antenna structure of the first embodiment of the present invention. FIG. 2 shows an assembly drawing of the single feed-in dual-band antenna structure of the first embodiment of the present invention. FIG. 3 shows another side of the basal plate of FIG. 2. As shown in FIG. 1, FIG. 2 and FIG. 3, a single feed-in dual-band antenna structure of the present invention comprises a first radiation unit 1, a basal plate 2 and a plurality of matching components 3.

The first radiation unit 1 comprises a base 11 and a metal layer 12 which is arranged on a surface of the base 11. The metal layer 12 comprises a plurality of straight lines 121, a plurality of wires 122 and an electrode tip 123. The straight lines 121 are arranged on a top face 111 and a bottom face 112 of the base 11. The wires 122 penetrate the base 11 and are electrically connected to two sides of the straight lines 121 and the electrode tip 123, so that the metal layer 12 twines and is arranged at the base 11. In FIG. 1, FIG. 2 and FIG. 3, the base 11 is a ceramic material or fiberglass.

The basal plate 2 comprises a front side 21, a back side 22 and an edge side 23. A first ground unit 24, a signal feed-in unit 25, a second radiation unit 26 and an electrode part 28 are arranged on the front side 21. A third radiation unit 27 is arranged on the edge side 23. Moreover, a second ground unit 29 corresponding to the first ground unit 24 is arranged on the back side 22 of the basal plate 2. A clearance area 201 corresponding to the first radiation unit 1 is arranged on the back side 22 of the basal plate 2. Namely, the single feed-in dual-band antenna structure of the present invention further comprises the first ground unit 24, the signal feed-in unit 25, the second radiation unit 26, the third radiation unit 27, the electrode part 28, the second ground unit 29 and the clearance area 201.

A spacing 241 is between the signal feed-in unit 25 and the first ground unit 24. The signal feed-in unit 25 comprises a first signal feed-in line 251 and a second signal feed-in line 252. The first signal feed-in line 251 comprises a first endpoint 2511 and a second endpoint 2512. The second signal feed-in line 252 comprises a third endpoint 2521 and a fourth endpoint 2522. A gap 253 is between the second endpoint 2512 and the third endpoint 2521. The second endpoint 2512 and the third endpoint 2521 are electrically connected to the matching components 3 across the gap 253.

The second radiation unit 26 comprises a first radiation line segment 261 and a second radiation line segment 262. One side of the first radiation line segment 261 is electrically connected to the first signal feed-in line 251. The other side of the first radiation line segment 261 is extended to the edge side 23 and is corresponding to the second radiation line segment 262. The matching components 3 are electrically connected between the first radiation line segment 261 and the second radiation line segment 262.

The third radiation unit 27 is arranged on the edge side 23 and is electrically connected to the second radiation line segment 262 of the second radiation unit 26.

The electrode part 28 comprises a first electrode part 281 and a second electrode part 282. The first electrode part 281 is corresponding to the first signal feed-in line 251 of the signal feed-in unit 25. The first electrode part 281 and the second electrode part 282 are electrically connected to the electrode tip 123 of the first radiation unit 1. The matching components 3 are electrically connected between the first electrode part 281 and the first endpoint 2511 of the first signal feed-in line 251.

The matching components 3 are respectively electrically connected to the first ground unit 24 and between the first signal feed-in line 251 and the second signal feed-in line 252, and between the second endpoint 2512 of the first signal feed-in line 251 and the third endpoint 2521 of the second signal feed-in line 252 to adjust the 2.4 GHZ-5 GHZ impedance and frequency, and are electrically connected between the first endpoint 2511 of the first signal feed-in line 251 and the first electrode part 281 to adjust the 2.4 GHZ frequency, and are electrically connected between the first radiation line segment 261 and the second radiation line segment 262 of the second radiation unit 26 to adjust the 5 GHZ frequency. In FIG. 1, FIG. 2 and FIG. 3, the matching component 3 is an inductance element.

After the first radiation unit 1 is electrically connected to the basal plate 2, the present invention adjusts the first radiation unit 1 to control the 2.45 GHZ frequency range impedance, resonant frequency, bandwidth and radiation effect. According to the third radiation unit 27 frequency wave length ($\frac{1}{2}\lambda$, $\frac{1}{4}\lambda$, $\frac{1}{8}\lambda$ or $\frac{1}{16}\lambda$), the present invention controls the 5 GHZ (4.9 GHZ-6 GHZ) frequency range to achieve the predetermined target impedance, resonant frequency, bandwidth and radiation efficiency, and the antenna efficiency can be increased effectively. The third radiation unit 27 can increase the antenna radiation efficiency. A length of the third radiation unit 27 is between 2 mm and 20 mm to reduce the antenna size effectively.

Figure 4:
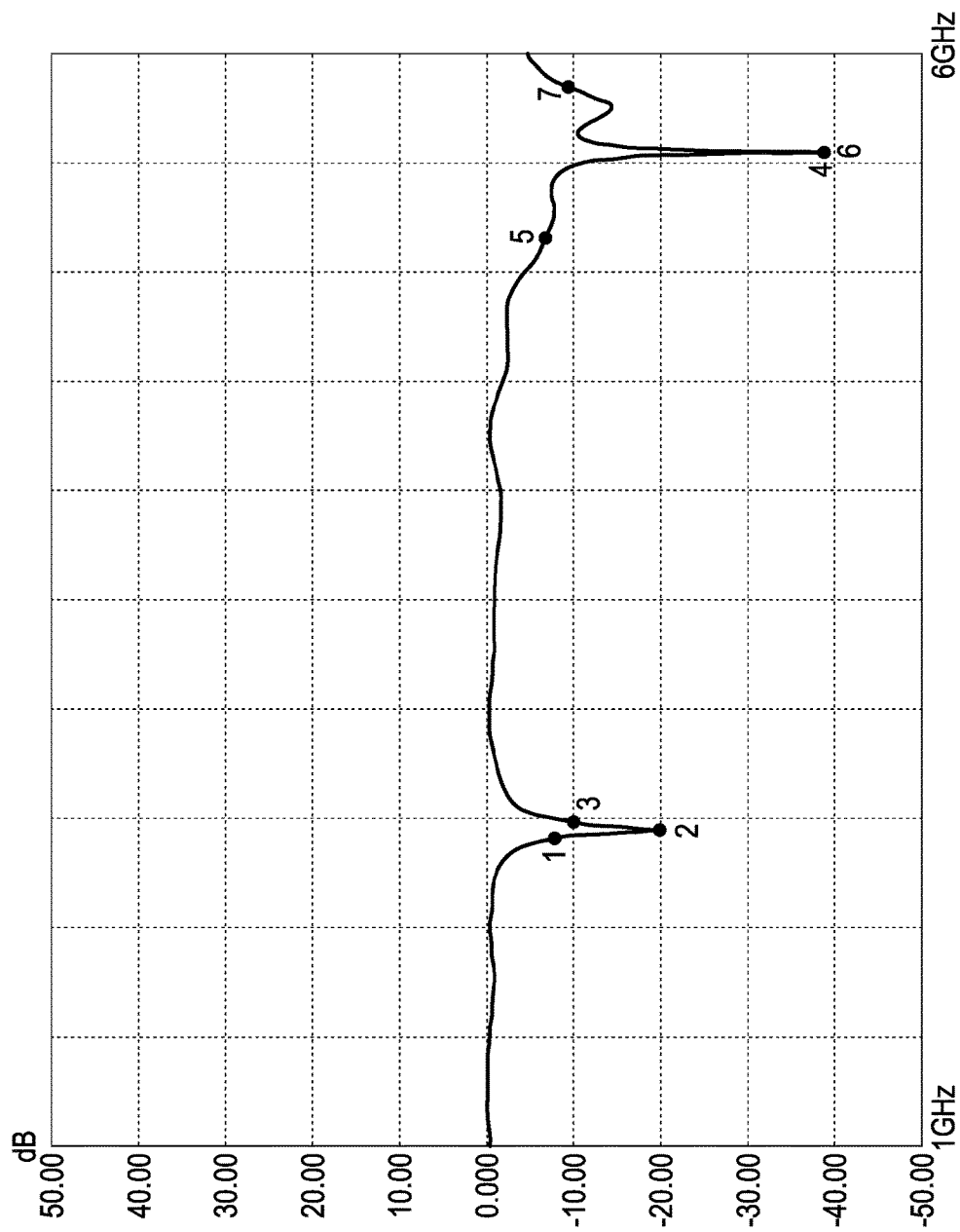
FIG. 4 shows a graph of the reflection coefficient testing of the single feed-in dual-band antenna structure of the first embodiment of the present invention.

FIG. 4 shows a graph of the reflection coefficient testing of the single feed-in dual-band antenna structure of the first embodiment of the present invention. Please refer to FIG. 1 as well at the same time. As shown in FIG. 4, when using the present invention, at the frequency 2.400 GHZ is −7.1008 dB, at the frequency 2.450 GHZ is −19.766 dB, at the frequency 2.483 GHZ is −9.7773 dB, at the frequency 5.550 GHZ is −40.507 dB, at the frequency 5.150 GHZ is −6.7341 dB, at the frequency 5.550 GHZ is −40.507 dB and at the frequency 5.850 GHZ is −9.0733 dB. Therefore, the present invention adjusts the first radiation unit 1 to control the 2.45 GHZ frequency range impedance, resonant frequency, bandwidth and radiation effect. According to the third radiation unit 27 frequency wave length ($\frac{1}{2}\lambda$, $\frac{1}{4}\lambda$, $\frac{1}{8}\lambda$ or $\frac{1}{16}\lambda$), the present invention controls the 5 GHZ (4.9 GHZ-6 GHZ) frequency range to achieve the predetermined target impedance, resonant frequency, bandwidth and radiation efficiency, and the antenna efficiency can be increased effectively. The third radiation unit 27 can increase the antenna radiation efficiency. The length of the third radiation unit 27 is between 2 mm and 20 mm to reduce the antenna size effectively.

Figure 5:
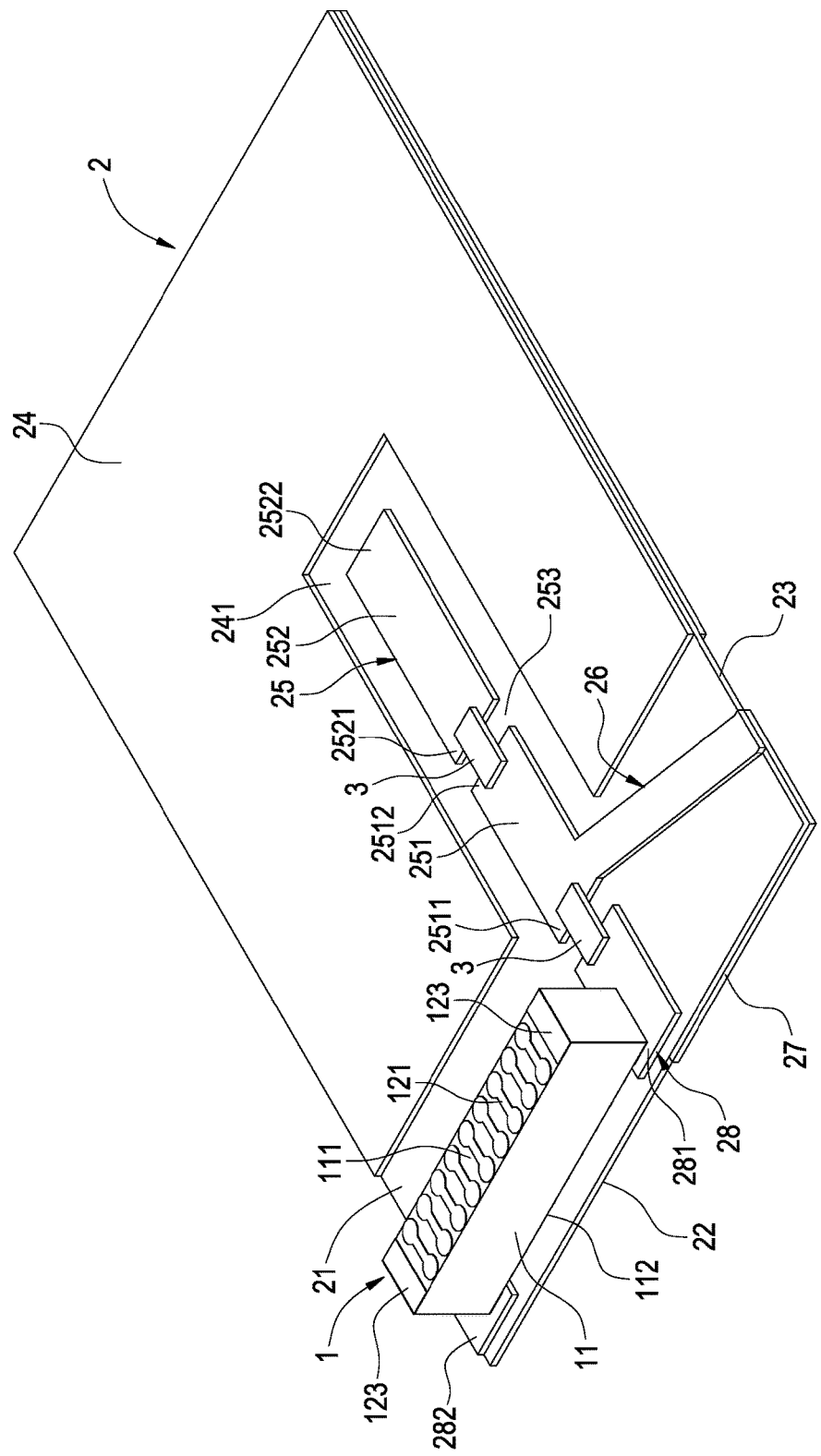
FIG. 5 shows an assembly drawing of the single feed-in dual-band antenna structure of the second embodiment of the present invention.

FIG. 5 shows an assembly drawing of the single feed-in dual-band antenna structure of the second embodiment of the present invention. As shown in FIG. 5, the second embodiment is roughly the same with the first embodiment. The difference is that after one side of the second radiation unit 26 is electrically connected to the first signal feed-in line 251 of the signal feed-in unit 25, the other side of the second radiation unit 26 is extended to the edge side 23 to be electrically connected to the third radiation unit 27. Similarly, the second embodiment of the present invention controls the frequency range to achieve the predetermined target impedance, resonant frequency, bandwidth and radiation efficiency, and the antenna efficiency can be increased effectively.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A single feed-in dual-band antenna structure comprising:
   a basal plate comprising a front side, a back side and an edge side, wherein a first ground unit, a signal feed-in unit, a second radiation unit and an electrode part are arranged on the front side, wherein a third radiation unit is arranged on the edge side, wherein a second ground unit corresponding to the first ground unit is arranged on the back side of the basal plate;
   a first radiation unit electrically connected to the electrode part; and
   a plurality of matching components electrically connected between the first ground unit, the signal feed-in unit and the electrode part.

2. The single feed-in dual-band antenna structure in claim 1, wherein a spacing is between the signal feed-in unit and the first ground unit; the signal feed-in unit comprises a first signal feed-in line and a second signal feed-in line; the first signal feed-in line comprises a first endpoint and a second endpoint; the second signal feed-in line comprises a third endpoint and a fourth endpoint; a gap is between the second endpoint and the third endpoint.

3. The single feed-in dual-band antenna structure in claim 2, wherein the second endpoint and the third endpoint are electrically connected to the matching components across the gap.

4. The single feed-in dual-band antenna structure in claim 1, wherein the second radiation unit comprises a first radiation line segment and a second radiation line segment; one side of the first radiation line segment is electrically connected to the first signal feed-in line; the other side of the first radiation line segment is extended to the edge side and is corresponding to the second radiation line segment.

5. The single feed-in dual-band antenna structure in claim 4, wherein the matching components are electrically connected between the first radiation line segment and the second radiation line segment.

6. The single feed-in dual-band antenna structure in claim 1, wherein the third radiation unit is arranged on the edge side and is electrically connected to the second radiation line segment of the second radiation unit.

7. The single feed-in dual-band antenna structure in claim 3, wherein the first radiation unit comprises a base and a metal layer arranged on a surface of the base; the metal layer comprises a plurality of straight lines, a plurality of wires and an electrode tip; the straight lines are arranged on a top face and a bottom face of the base; the wires penetrate the base and are electrically connected to two sides of the straight lines and the electrode tip, so that the metal layer twines and is arranged at the base.

8. The single feed-in dual-band antenna structure in claim 7, wherein the base is a ceramic material or fiberglass.

9. The single feed-in dual-band antenna structure in claim 7, wherein the electrode part comprises a first electrode part and a second electrode part; the first electrode part is corresponding to the first signal feed-in line of the signal feed-in unit; the first electrode part and the second electrode part are electrically connected to the electrode tip of the first radiation unit.

10. The single feed-in dual-band antenna structure in claim 7, wherein the matching components are electrically connected between the first electrode part and the first endpoint of the first signal feed-in line.

11. The single feed-in dual-band antenna structure in claim 7, wherein the matching components are electrically connected to the first ground unit and between the first signal feed-in line and the second signal feed-in line respectively.

12. The single feed-in dual-band antenna structure in claim 1, wherein the matching components are inductance elements.

13. The single feed-in dual-band antenna structure in claim 1, wherein a length of the third radiation unit is between 2 mm and 20 mm.

14. The single feed-in dual-band antenna structure in claim 1, wherein one side of the second radiation unit is electrically connected to the first signal feed-in line of the signal feed-in unit; the other side of the second radiation unit is extended to the edge side and is electrically connected to the third radiation unit.

15. The single feed-in dual-band antenna structure in claim 1, wherein a clearance area corresponding to the first radiation unit is arranged on the back side of the basal plate.

* * * * *